US009515755B2

United States Patent
Honig et al.

(10) Patent No.: US 9,515,755 B2
(45) Date of Patent: Dec. 6, 2016

(54) DYNAMICALLY SELF-ORGANIZING AD-HOC TDMA COMMUNICATIONS SYNCHRONIZATION METHOD

(75) Inventors: Alex Yakov Honig, Netania (IL); Yakir Matusovsky, Rishon le Zion (IL); Uzi Hanuni, Givat Yeshayahu (IL); Boaz Dagan, Gedera (IL)

(73) Assignee: MAXTECH COMMUNICATION NEWORKS LTD., Yavne (IL)

( * ) Notice: Subject to any disclaimer, the term of this patent is extended or adjusted under 35 U.S.C. 154(b) by 211 days.

(21) Appl. No.: 14/009,180
(22) PCT Filed: Apr. 1, 2012
(86) PCT No.: PCT/IL2012/000142
§ 371 (c)(1),
(2), (4) Date: Dec. 19, 2013
(87) PCT Pub. No.: WO2012/137194
PCT Pub. Date: Oct. 11, 2012

(65) Prior Publication Data
US 2014/0105205 A1  Apr. 17, 2014

Related U.S. Application Data

(60) Provisional application No. 61/472,216, filed on Apr. 6, 2011.

(51) Int. Cl.
H04J 3/06 (2006.01)
H04B 7/26 (2006.01)
(Continued)

(52) U.S. Cl.
CPC ........... *H04J 3/0652* (2013.01); *H04B 7/2643* (2013.01); *H04W 56/001* (2013.01);
(Continued)

(58) Field of Classification Search
CPC ..... H04B 7/2643; H04J 3/0652; H04J 3/0691; H04W 56/001; H04W 56/002; H04W 56/0085; H04W 84/18; H04W 56/00; H04W 24/00; H04W 48/16;
(Continued)

(56) References Cited

U.S. PATENT DOCUMENTS 5,613,211 A * 3/1997 Matsuno .............. H04B 7/2668
370/350
6,111,927 A  8/2000 Sokoler
(Continued)

FOREIGN PATENT DOCUMENTS

CN 1728580 A 2/2006
KR WO 2010126282 A2 * 11/2010 ........ H04W 56/0075

OTHER PUBLICATIONS

Leutert, Rolf, "Inside 802.11n Technical details about the new WLAN standard", Mar. 2009, Leutert NetServices, Cisco PSE Day Mar. 2009, pp. 30-31.*
(Continued)

*Primary Examiner* — Un C Cho
*Assistant Examiner* — Shah Rahman

(57) ABSTRACT

A method and system for TDMA synchronization including providing an ad-hoc TDMA mobile communication network, the communication network includes a plurality of mobile units, transmitting an information packet from a mobile unit of the plurality of mobile units to each remaining one of the plurality of mobile units. The method and system further including comparing at each remaining one of the plurality of mobile units the corresponding preamble detection time $t_{rx,i}$ with a predetermined time parameter $t_{corr}$, and adjusting the corresponding preamble detection time $t_{rx,i}$ of each remaining one of the plurality of mobile units accordingly. In addition, a method for logical timeslot synchronization and its enhancement using directed synchronization procedure with a refresh procedure are disclosed if a transmitting mobile unit exits the communication network and reconnects thereto.

15 Claims, 7 Drawing Sheets

(51) Int. Cl.
*H04W 56/00* (2009.01)
*H04W 84/18* (2009.01)

(52) U.S. Cl.
CPC ............ H04W 74/0866; H04W 40/12; H04W 56/0075; H04W 8/005 *H04W 56/002* (2013.01); *H04W 56/0085* (2013.01); *H04W 84/18* (2013.01); *H04J 3/0691* (2013.01)

(58) Field of Classification Search
USPC ........................................................ 370/350
See application file for complete search history.

(56) References Cited

U.S. PATENT DOCUMENTS

| | | | |
|---|---|---|---|
| 6,807,165 B2* | 10/2004 | Belcea | H04W 40/08 370/316 |
| 7,733,843 B1 | 6/2010 | Vogl et al. | |
| 2002/0001299 A1* | 1/2002 | Petch | H04J 3/0682 370/350 |
| 2005/0128991 A1 | 6/2005 | Dayanandan et al. | |
| 2006/0025136 A1 | 2/2006 | Fujita et al. | |
| 2006/0030343 A1* | 2/2006 | Ebner | H04W 56/002 455/502 |
| 2007/0008947 A1* | 1/2007 | Belcea | H04W 56/0065 370/350 |
| 2008/0043886 A1* | 2/2008 | Inagawa | H04B 1/7183 375/343 |
| 2008/0240143 A1* | 10/2008 | Koga | H04B 3/542 370/445 |
| 2009/0154529 A1* | 6/2009 | Cho | H04L 27/2656 375/137 |
| 2009/0323766 A1 | 12/2009 | Wang et al. | |
| 2010/0265936 A1 | 10/2010 | Yeh et al. | |
| 2011/0235560 A1* | 9/2011 | Kurita | G08B 17/00 370/311 |

OTHER PUBLICATIONS

International Search Report dated Aug. 10, 2012 in corresponding International Application No. PCT/IL2012/000142.
Extended European Search Report, dated Sep. 29, 2014, issued in the counterpart European application No. EP12767982.7.
International Preliminary Report on Patentability Chapter I, dated Oct. 8, 2013, issued in the corresponding PCT International application No. PCT/IL2012/000142, dated Apr. 1, 2012.
Office Action issued by the State Intellectual Property Office of the P.R.C (SIPO), dated Dec. 2, 2015, in the counterpart Chinese application No. 201280023785.3.—translation.

* cited by examiner

DYNAMICALLY SELF-ORGANIZING AD-HOC TDMA COMMUNICATIONS SYNCHRONIZATION METHOD

FIELD OF THE INVENTION

This invention relates to a dynamically self-organizing ad-hoc TDMA communications synchronization method without the requirement for a fixed infrastructure.

BACKGROUND OF THE INVENTION

The following prior art is believed to be the current status of the art:

U.S. Pat. No. 7,082,111 describes a method for allocating a set of time slots belonging to a common time division multiple access (TDMA) channel to a network of transceiver nodes. The method includes the steps of dividing the set of time slots into a plurality of time slot sub-sets and defining for each transceiver node a common function that assigns one time slot sub-set of the plurality of time slot sub-sets to each point in space, where each point in space is identified by a unique set of space coordinates by periodically identifying a set of space coordinates.

U.S. Pat. No. 6,490,456 describes a method for locating a mobile unit without synchronizing from base-stations is provided. A triangulation scheme where distances between a plurality of base-stations and a mobile unit (herein termed mobile) are calculated by measuring at least three round-trip-delay-values.

US Published Patent Application No. 2008/0165745 describes a system and method for communicating includes a plurality of wireless nodes forming a Time Division Multiple Access (TDMA) mesh network. Each wireless node includes a transmitter and receiver and is operative for transmitting data packets across the TDMA mesh network from a source node through intermediate nodes to a destination node using a TDMA epoch such that a slot of channel time is allocated in both time and TDMA epoch prior to a wireless node transmitting the data packet.

"DRAND: Distributed Randomized TDMA Scheduling for Wireless Ad-hoc Networks" by I. Rhee et al., Mobi-Hoc'06, May 22-25, 2006, Florence, Italy, describes a randomized time slot scheduling algorithm which does not require time synchronization.

However, the prior art does not describe a dynamically self-organizing ad-hoc TDMA communications synchronization method without a fixed infrastructure. Thus, there is an unmet need in the art for providing a TDMA communications synchronization method which is independent of a fixed infrastructure and is self-organizing.

SUMMARY OF THE INVENTION

This invention seeks to provide a dynamically self-organizing ad-hoc TDMA communications synchronization method without a fixed infrastructure. The present invention does not utilize a base station and/or similar infrastructure for controlling and overseeing voice and data transfer between mobile units. In the present invention, the mobile units or transceiver nodes are self-organizing.

The synchronization method described herein relates to a typical communications network, which supports voice communication and data transfer and connects to existing communication devices, allowing the integration of the present communications network into wider networks. The present communications network does not require fixed infrastructures and is self-organizing, therefore, making the communications network, which utilizes the synchronization method of the present invention to be particularly useful for by public safety services, such as law-enforcement services, rescue teams and military forces and any other users or group of users who do not have any communications infrastructure.

A mother mobile unit which is typically but not necessarily the first mobile unit activated mobile unit in the network, temporarily controls the transmission in the network by transmitting an information packet to other members of the network. The first mobile unit remains the controlling mobile unit, if the criteria for remaining as the mother mobile unit are fulfilled. If the criteria for remaining the mother mobile unit are unfulfilled, the mother mobile unit is exchanged with a different member of the network which fulfills the criteria. Typical criteria include, inter alia, the condition that at a mobile unit a detection time of a preamble of an information packet is less than a predetermined time criterion, $t_{corr}$. Typically, the predetermined time criterion is approximately 300 μsecs. It is appreciated that the value of $t_{corr}$ is variable and varies in accordance with the physical interface (PHY) of the mobile unit.

It is an object of the present invention to provide a method for TDMA synchronization including providing an ad-hoc TDMA mobile communication network, the communication network includes a plurality of mobile units, transmitting an information packet from a mobile unit of the plurality of mobile units to each remaining one of the plurality of mobile units, the information packet includes at least a preamble, receiving the information packet at each remaining one of the plurality of mobile units, measuring at each remaining one of the plurality of mobile units a corresponding preamble detection time $t_{rx,i}$ of the information packet. The method further including comparing at each remaining one of the plurality of mobile units the corresponding preamble detection time $t_{rx,i}$ with a predetermined time parameter $t_{corr}$, and adjusting the corresponding preamble detection time $t_{rx,i}$ of each remaining one of the plurality of mobile units to equal to $t_{corr}$, if $t_{rx,i}$ is less than $t_{corr}$, thereby synchronizing the TDM time slot of each remaining one of the plurality of the mobile units with the TDM slot of the transmitting mobile unit.

It is an object of the present invention to disclose a system for TDMA synchronization including an ad-hoc TDMA mobile communication network, and a plurality of mobile units, wherein the mobile units receive an information packet including at least a preamble, the information packet is transmitted from a mother mobile unit of the communication network to each one of the plurality of mobile units, the each one of the plurality of mobile units measures a corresponding preamble detection time $t_{rx,i}$ and compares the corresponding preamble detection time $t_{rx,i}$ with a system time parameter $t_{corr}$ and adjusts the corresponding preamble detection time to equal the system time parameter tcorr, if the corresponding preamble detection time is less than $t_{corr}$.

It is an object of the present invention to disclose a device for TDMA synchronization in an ad-hoc TDMA mobile communication network, including the device receiving an information packet including at least a preamble, the information packet is transmitted from a mother mobile unit of the communication network to each the device, the device measures a corresponding preamble detection time $t_{rx,i}$ and compares the corresponding preamble detection time $t_{rx,i}$ with a predetermined time parameter $t_{corr}$ and adjusts the corresponding preamble detection time to equal the predetermined time parameter tcorr, if the corresponding preamble detection time is less than $t_{corr}$.

It is also an object of the present invention to disclose that each remaining one of the plurality of mobile units waits for a further information packet without adjusting the corresponding preamble detection time, if $t_{rx,i}$ of the each one of the plurality of mobile units equals $t_{corr}$ or if $t_{rx,i}$ is greater than $t_{corr}$.

It is a further object of the present invention to disclose that the information packet further includes a mobile unit identification number, MU_ID, a mobile unit synchronization identification number, SYNC_ID and a data payload.

It is also an object of the present invention to disclose identifying a predetermined slot time size $S_{size}$ for the information packet.

It is also an object of the present invention to disclose identifying the at least one mobile unit identification number MU_ID in the received communication packet.

It is a further object of the present invention to disclose identifying at each one of the plurality of the mobile units, a time slot number $S_{corr}$ at which the preamble terminates.

It is also another of the present invention to disclose a final time slot $S_{final}$ at which detection of the data packet received from the transmitting mobile unit is detected.

It is a further object of the present invention to disclose determining a time slot number $S_{start}$ for a commencement of common TDMA logical scheme from each remaining one of the plurality of the mobile units:

$$S_{start}=S_{size}*MU\_ID+S_{final}-S_{corr},$$

thereby frame synchronizing the common TDMA logical scheme from the at least one mobile unit and the each remaining one of the plurality of the mobile units.

It is also an object of the present invention to disclose that the information packet is received at different reception times.

It is a further object of the present invention to disclose comparing the mobile unit synchronization identification number of each remaining one of the plurality of mobile units with the mobile identification number of the transmitting mobile unit thereby ensuring that the each remaining one of the plurality remains in communication with the transmitting mobile unit.

It is an object of the present invention to disclose that the predetermined time parameter $t_{corr}$ is determined by implementation of the physical interface.

It is a further object of the present invention to disclose that each remaining one of the plurality of mobile units retaining the SYNC_ID if the transmitting mobile unit exits the communication network.

It is also an object of the present invention to disclose adjusting the SYNC_ID value of the each remaining one of the plurality of mobile units to correspond to the SYNC_ID value of the transmitting mobile unit if the SYNC_ID of the each remaining one of the plurality of mobile units is greater than the SYNC_ID value of the transmitting mobile unit.

It is a further object of the present invention to disclose that each remaining one of the plurality of mobile units retains its SYNC_ID value if the SYNC_ID value of the each remaining one of the plurality of mobile units is less than the SYNC_ID value of said transmitting mobile unit or equals the SYNC_ID value of the transmitting mobile unit.

BRIEF DESCRIPTION OF THE DRAWINGS

A preferred embodiment of the current invention is described hereinbelow with reference to the following drawings.

DETAILED DESCRIPTION OF A PREFERRED EMBODIMENT OF THE PRESENT INVENTION

Figure 1:
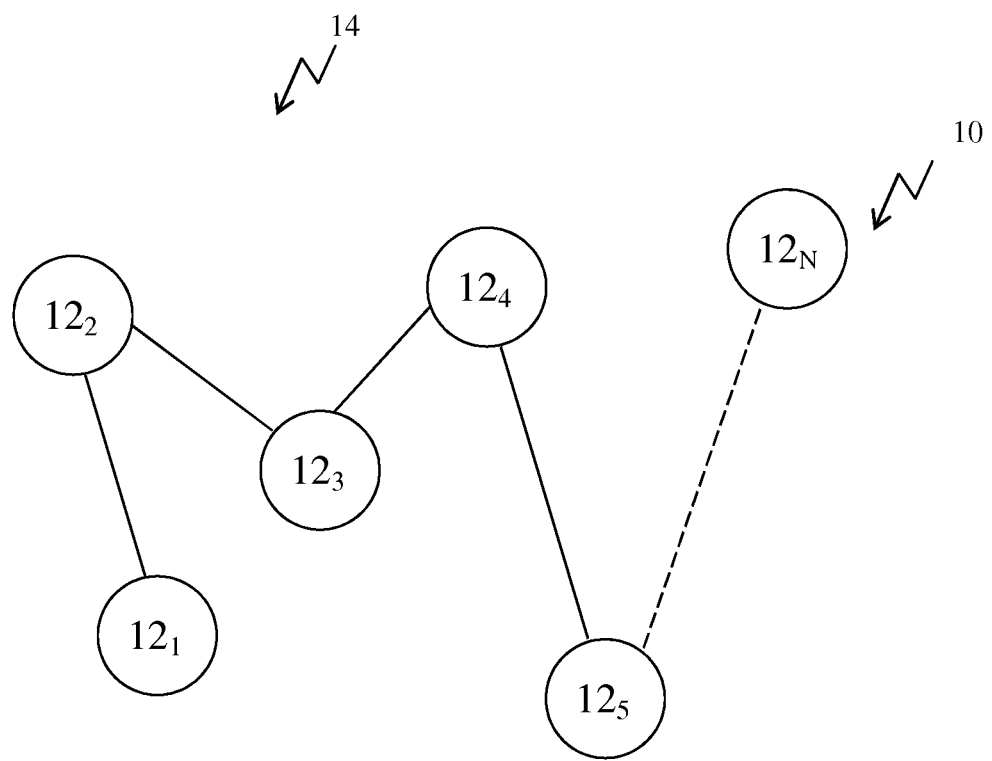
FIG. 1 shows a dynamically self-organizing ad-hoc TDMA communications network including, inter alia, a plurality of mobile units or nodes inter-communicating in a dynamic network topology, in accordance with a preferred embodiment of the present invention.

Reference is now made to FIG. 1, which shows a dynamically self-organizing ad-hoc TDMA communications network 10 including, inter alia, a plurality of mobile units or nodes, $12_1$, $12_2$, $12_3$, $12_4$, $12_5$ . . . $12_N$ inter-communicating in a dynamic synchronized network topology 14, in accordance with a preferred embodiment of the present invention. The value of N depends on the number of mobile units participating in the network 10 and is dependent on the network design.

The mobile units $12_1$, $12_2$ . . . $12_N$ are typically personal radio communication units, with very low power consumption. The mobile units $12_1$, $12_2$ . . . $12_N$ inter-communicate so as to generate the self-organizing ad-hoc TDMA communications network 10. The dynamic network 10 ensures a good Quality of Service and a high data transfer capacity.

Typically, the network 10 supports voice and data transfer and is able to connect to other operating communication devices, allowing the integration of the network 10 to different and wider networks.

It is appreciated that there are alternative topologies to the present topology 14, shown in FIG. 1.

In order to prevent communication collision and confusion, the ad-hoc mesh network 10 requires time synchronization and frame or logic synchronization to ensure that each mobile unit $12_1$, $12_2$ . . . $12_N$ transmits information at a unique time in a TDM time slot.

A member of the plurality of mobile units $12_1$, $12_2$ . . . $12_N$, which is typically but not necessarily, a first mobile unit $MU_i$ to be activated in the network 10, termed herein as the "mother mobile unit", commences communication with the remaining mobile units of the network $MU_{i \neq j}$. The mother mobile unit $MU_i$ transmits an information packet 18 to the other members $MU_{i \neq j}$ of the network 10 so that the mobile units $MU_{i \neq j}$ adjust their respective clock-times relative to the received time transmitted by $MU_i$. The ad-hoc mesh network 10 uses spineless clock synchronization.

Typically, the mobile units $12_1$, $12_2$ ... $12_N$ are activated at different times and therefore to enable voice and data transmission within the network 10 without interference between the various members of the network 10, time synchronization and frame synchronization are required within the members of the network 10. The voice and data communications' times, in any given TDM time slot, are unique to each member of the network 10.

It is appreciated that the synchronization methods described herein are applicable and useful for any ad-hoc mesh TDMA network and are not limited to the communications network 10 described herein. The current communications network 10 described herein is by way of example, only.

Figure 2:
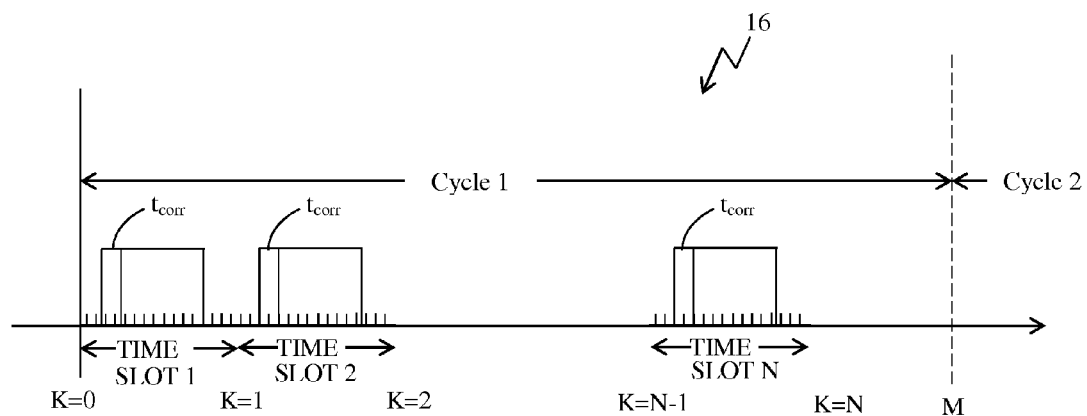
FIG. 2 shows a periodic TDM time slot having a fixed cycle size, in accordance with a preferred embodiment of the present invention.

Reference is now made to FIG. 2, which shows a periodic TDM time slot 16, preferably having a constant cycle size, in accordance with a preferred embodiment of the present invention. In the network 10 communication between the mobile units $12_1$, $12_2$ ... $12_N$ is synchronized in accordance with a periodic and sequential TDM time slot, having a constant cycle size.

FIG. 2 shows the time slots, TS=1, 2 ... M. The time slots in each cycle are fixed, cyclic and sequential and are referenced: Cycle 1: [K, 2K, 3K, ... NK, M]; Cycle 2: [K, 2K, 3K, ... NK, ..., M] ... Cycle P: [K, 2K, 3K, ... NK, ..., M], where M>NK.

In order to permit voice and data transfer within a cycle, it is required to ensure that M>NK.

Furthermore, in order to maximize network bandwidth, preferably, M should be much greater than NK. However, M is typically constrained by time synchronization limitations for the cycle size.

The mobile units $12_1$, $12_2$ ... $12_N$ typically connect at different connection times to the network 10 and therefore require clock synchronization and frame synchronization in order to ensure that voice and data communications' times, in any given time slot, are unique to each member of the network 10. In order to enable voice and data transfer without interference between the mobile units $12_1$, $12_2$ ... $12_N$ of the network 10, the voice and data transmissions within the network 10 are required to be time-synchronized in the time slots TS=1, TS=2, ... TS=M.

It is appreciated that the time slots for the network 10 are substantially of the same size. It is also appreciated that $t_{corr}$ for the network 10 is substantially constant for all the mobile units 12 ... 12 operating in the network 10.

In order to maintain time synchronization within the network 10 and prevent a deviation of the mobile units' clocks of more than approximately 20 μsecs (typical deviation), it is required to maintain a periodic transmission of each mobile unit $12_1$ ... $12_N$ during a cycle duration. It is appreciated that this deviation limit of 20 μsecs is dependent on the PHY properties of the network 10.

FIG. 2 shows that in a synchronized transmission environment in the network 10, in cycle 1, the mobile unit $MU_1$ ($12_1$) transmits in time slot TS=1, the mobile unit $MU_2$ ($12_2$) transmits in time slot TS=2 ... and the mobile unit $MU_N$ ($12_N$) transmits in time slot TS=N. This transmission pattern is repeated in cycle 2 and for the remaining transmission cycles during operation of the network 10.

Typically, each time slot $TS_{i=1 \ldots M}$ includes an arbitrary period of 500 μsecs and an arbitrary M of 200. Thus, the typical time length of each cycle is 100 ms.

Figure 3:
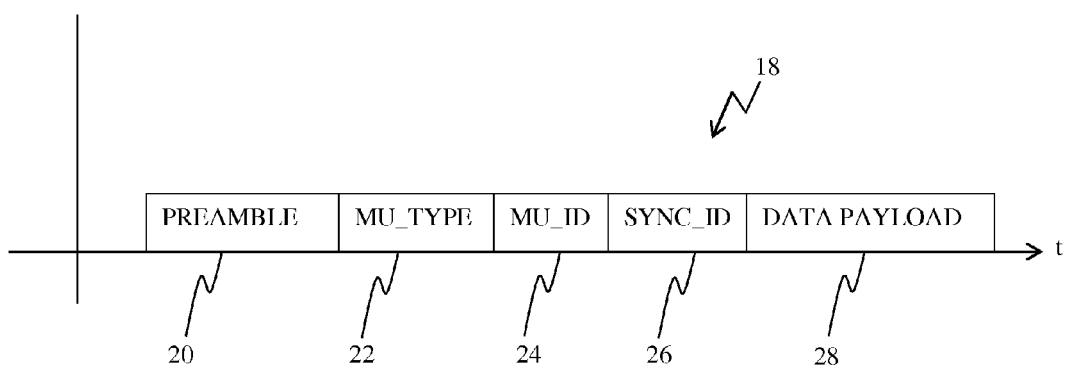
FIG. 3 shows a format of an information packet, in accordance with a preferred embodiment of the present invention.

Reference is now made to FIG. 3, which shows the format of the information packet 18, in accordance with a preferred embodiment of the present invention. The information packet 18 typically includes, inter alia, a preamble portion 20, a mobile unit type MU_TYPE 22, a mobile unit identification number portion, MU_ID, 24, a synchronization identification number, SYNC_ID, 26 and a data portion 28.

The preamble portion 20 is common to all members and mobile units $12_1$, $12_2$ ... $12_N$ of the network 10.

The MU_TYPE 22 differentiates between information packets. For example, if MU_TYPE=0, this indicates that the information packet 18 is a control packet and if MU_TYPE=1 indicates that the information packet 18 is a user data packet.

The mobile unit identification number MU_ID is a parameter assigned by the network and/or user. It is appreciated that each mobile unit $12_1$, $12_2$ ... $12_N$ has a unique identification number MU_ID 24.

The parameter SYNC_ID 26 is a system parameter.

The data portion 28 of the information packet 18 includes application data intended for higher layers.

The information packet 18 is received after a time $t_{corr}$. $t_{corr}$ is a common parameter amongst the mobile units $12_1$, $12_2$ ... $12_N$. Additionally, for the present topology 14, it is assumed that the data propagation time $t_p \ll t_{corr}$. Therefore, $t_p$ is negligible compared to $t_{corr}$ and is ignored. $t_{corr}$ includes the length of the preamble and is predefined by the information packet 18 contents length as well as a delay caused by implementation. $t_{corr}$ is typically equal to approximately 350 μsecs.

Figure 4:
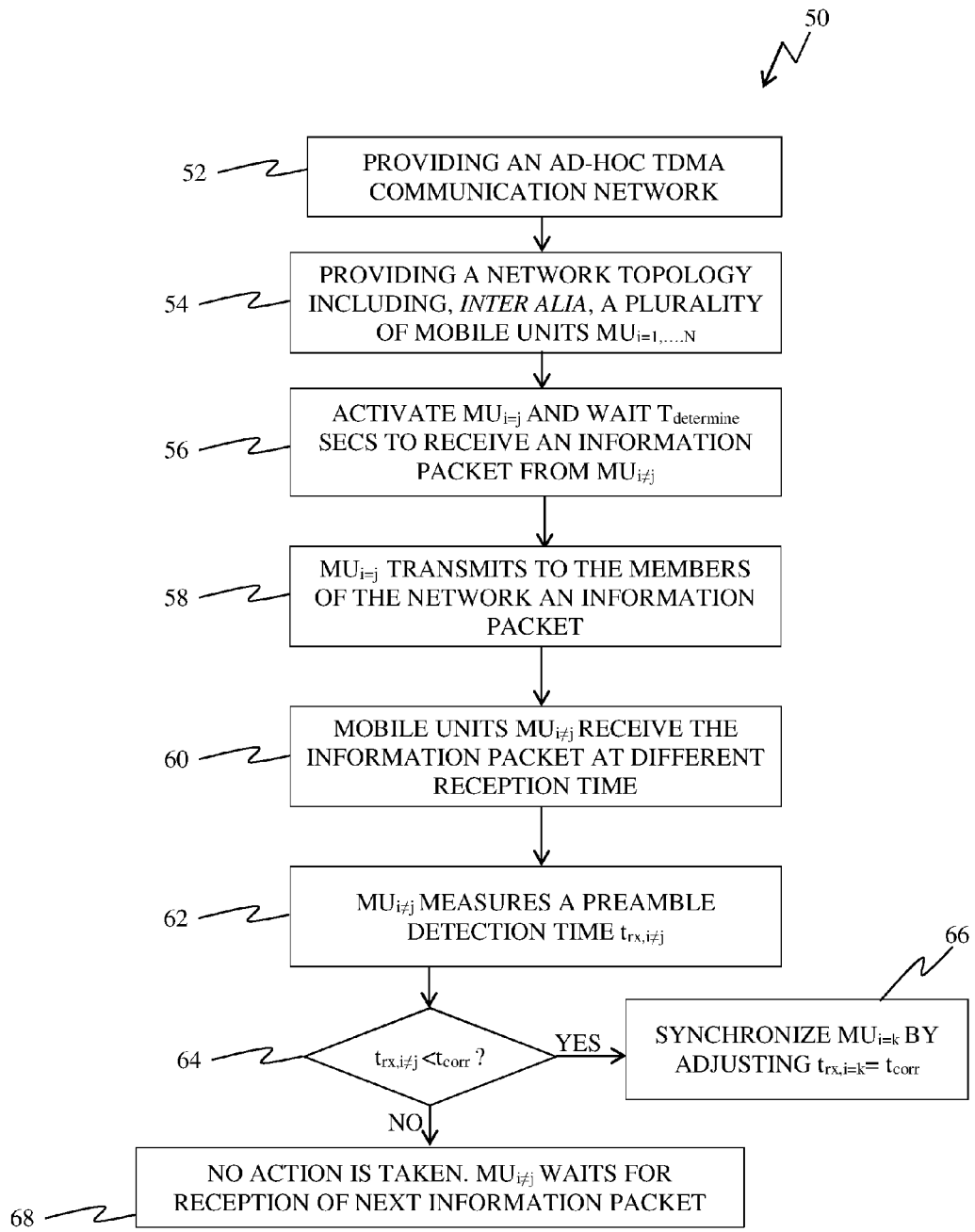
FIG. 4 shows a flow chart for time synchronizing the plurality of mobile units in the TDMA communication network, in accordance with a preferred embodiment of the present invention.

The clock cyclic counter in the mobile units $12_1$, $12_2$ ... $12_N$ runs from 1 to M, counting in basic system time units, for example, in units of μsecs. The mobile units $12_1$, $12_2$ ... $12_N$ receive the information packet 18 during a time from 0 to $t_{corr}$ and trigger a correction of the counter:

Reference is now made to FIG. 4, which shows a flow chart 50 for a typical procedure for time-synchronizing the mobile units the mobile units $12_1$, $12_2$ ... $12_N$ within the TDMA communication network 10 (step 52), in accordance with a preferred embodiment of the present invention.

In step 54, the network topology 14 is defined and the network 10 includes, inter alia, a plurality of mobile units $MU_{i=1 \ldots N}$. In step 56, a first mobile unit $MU_{i=j}$ is activated and $MU_{i \neq j}$ waits a predetermined time $T_{determine}$ to detect if any information packages, such as the information package 18, have been transmitted by any other member of the network 10. $T_{determine}$ is a system constant which is dependent on cycle size and is empirically determined. $T_{determine}$ is dependent on parameters, such as the minimum number of transmissions per cycle and link quality. $T_{determine}$ is typically 3 secs.

In step 58, if $MU_{i=j}$ does not detect any transmissions from the other mobile units in the network 10, the mobile unit $MU_{i=j}$ transmits the information package 18 to the other members $MU_{i \neq j}$ of the network 10.

Typically, the mobile units $MU_{i \neq j}$ are not activated at the same time and therefore, the mobile units $MU_{i \neq j}$ receive the information package 18 at different reception times (step 60).

In step 62, the mobile units $MU_{i \neq j}$ measure a corresponding preamble detection time $t_{rx, i \neq j}$ of the information packet 18.

In step 64, is compared with the predetermined information packet time parameter $t_{corr}$, for each of the mobile units $MU_{i \neq j}$. If $t_{rx,i=k}$ is less than $t_{corr}$, $t_{rx,i=k}$ for the $k^{th}$ mobile unit is adjusted to equal $t_{corr}$ (step 66). Thereby, the TDM time slot of the $k^{th}$ mobile unit is synchronized to the TDM slot of the mobile unit $MU_{i=j}$ and control passes to step A.

If $t_{rx,i \neq j}$ is not equal to $t_{corr}$, in step 68, that is $t_{rx,j \neq j}$ is equal to or greater than $t_{corr}$, no further action is taken and the mobile unit MUi≠j ignores the time synchronization process and waits for the next information packet 18.

Reference is now made to FIGS. 5A, 5B, 5C and 5D, which shows typical time slot plots for four mobile units $MU_{i=1,2,3,4}$, in accordance with a preferred embodiment of the present invention.

Figure 5A:
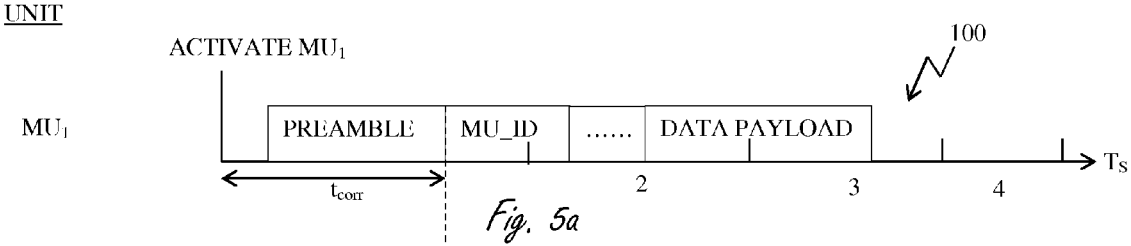
FIGS. 5A, 5B, 5C and 5D show time slot drawings for four mobile units, respectively, in the TDMA communication network, in accordance with a preferred embodiment of the present invention.

In FIG. 5A, a time slot 100 is shown for the mobile unit $MU_{i=1}$, which is the current mother mobile unit in the network 10 and transmits the information packet 18 to the mobile units $MU_{i=2,3,4}$.

Figure 5B:
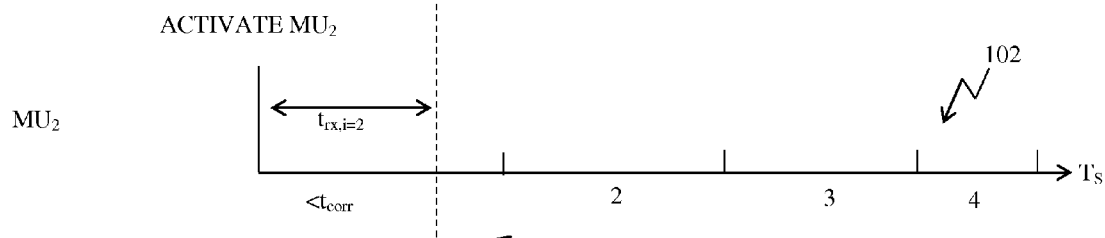

In FIG. 5B, a time slot 102 is shown for the mobile unit $MU_{i=2}$, which is activated and receives the information packet 18. $MU_{i=2}$ measures a preamble detection time $t_{rx,i=2}$ being less than $t_{corr}$. For $MU_{i=2}$, the corresponding preamble detection time is adjusted to equal to $t_{corr}$, thereby synchronizing the TDM time slot of $MU_{i=2}$ with the TDM slot of $MU_{i=1}$.

Figure 5C:

In FIG. 5C, a time slot 104 is shown for the mobile unit $MU_{i=3}$, which is activated and receives the information packet 18. $MU_{i=3}$ measures a preamble detection time $t_{rx,i=3}$ being equal to $t_{corr}$. For $MU_{i=3}$, since the corresponding preamble detection time equals $t_{corr}$, the TDM time slot of $MU_{i=3}$ is synchronized with the TDM slot of $MU_{i=1}$ no further action is taken and $MU_{i=3}$ waits to receive the next information packet 18.

Figure 5D:
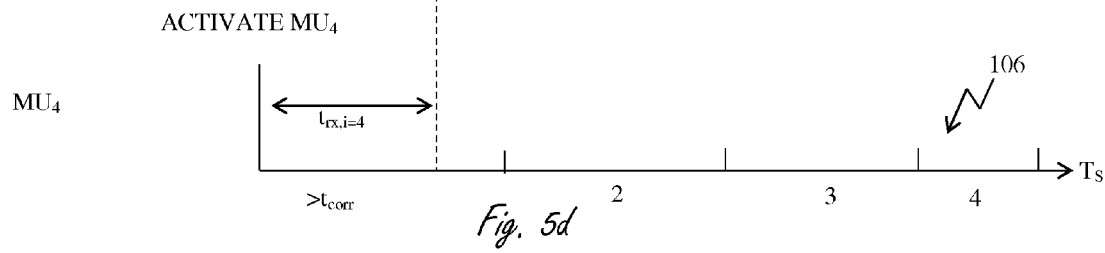

In FIG. 5D, a time slot 106, is shown for the mobile unit $MU_{1=4}$, which is activated and receives the information packet 18. $MU_{i=4}$ measures a preamble detection time $t_{rx,i=4}$ being greater than $t_{corr}$. If $t_{rx,i=4}$ is greater than $t_{corr}$, the mobile unit MUi≠j ignores the time synchronization process and waits for the next information packet 18.

Although the procedure for time synchronization is shown for four mobile units, it is appreciated that to a skilled man of the art, this procedure is adaptable to any number of mobile units of the network 10 and topology.

Figure 6A:
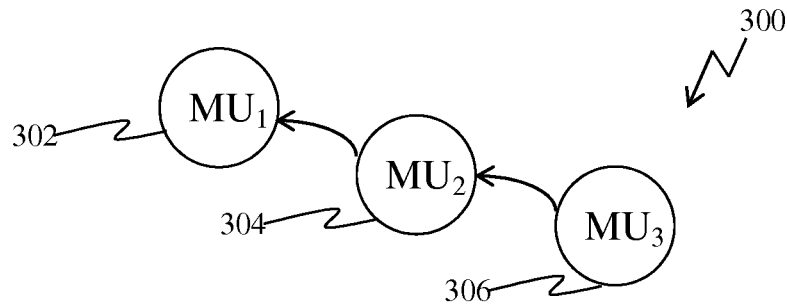
FIG. 6A shows a typical network topology including at least three mobile units in which one of the mobile units is in communication with two mother mobile units, in accordance with a preferred embodiment of the present invention.
Figure 6B:
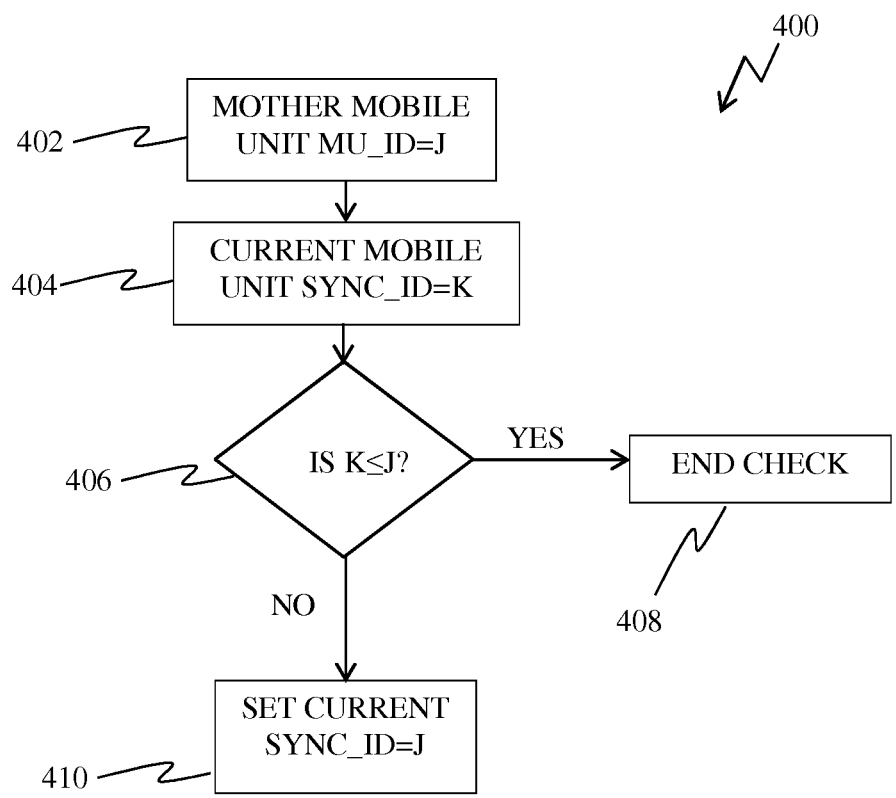
FIG. 6B shows a directed-synchronization procedure for the mobile units included in the communications network topology of FIG. 6A, in accordance with a preferred embodiment of the present invention.

Reference is now made to FIGS. 6A and 6B, which shows a procedure for directed synchronization, in accordance with a preferred embodiment of the present invention.

FIG. 6A shows the three mobile units $MU_{i=1}$, 302, (SYNC_ID=302), $MU_{i=2}$, 304, (SYNC_ID=304) and $MU_{i=3}$, 306 (SYNC_ID=306) communicating within the network 300, in accordance with a preferred embodiment of the present invention.

The $MU_{i=1}$ 302 is the mother mobile unit in the network 300 to which all other members of the network 300 are time and frame synchronized. The second mobile unit $MU_{i=2}$ 304 is activated and $MU_{i=2}$ 304 is synchronized to $MU_{i=1}$ 302 and receives synchronization identification of 302, SYNC_ID=302. The third mobile unit $MU_{i=3}$ 306 is activated and is synchronized to $MU_{i=2}$ 304 and receives the synchronization identification of 304, SYNC_ID=302

FIG. 6B shows a procedure 400 for checking that the mobile units remain synchronized in accordance with a preferred embodiment of the present invention. In step 402, a value of SYNC_ID(302)=J of the mother unit 302 is identified by mobile unit 304. In step 404, the mobile unit 304 identifies its own value of SYNC_ID(304)=K. In step 406, a check is performed to compare the values of J and K. If K≤J, then control proceeds to step 408 and no further action is required and the logic synchronization is inhibited. If K>J, then control proceeds to step 410 and the MU_ID of the mobile unit 304 is set to J and the logical synchronization proceeds to a procedure described hereinbelow in FIG. 7.

The procedure for checking SYNC_ID with the MU_ID of the mother unit 302 is typically performed at every N cycles, thus ensuring the stability in the synchronization.

Figure 6C:
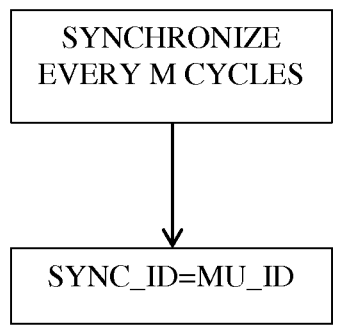
FIG. 6C shows a synchronization ID refresh process, in accordance with a preferred embodiment of the present invention.

Reference is now made to FIG. 6C, which shows a synchronization ID refresh process, in accordance with a preferred embodiment of the present invention. For example, if the mobile unit 302 leaves the network 300 and at a later time, the mobile unit 302 wishes to reconnect to the network 300, it is necessary for the mobile unit 302 to resynchronize to the network 300. In this case, the mobile units 304 and 306 disregard the reconnection of the mobile unit 302, since the mobile units 304 and 306 maintain their previous synchronization of SYNC_ID=302, in accordance with FIG. 6B.

In FIG. 6C, during the period of time that the mobile unit 302 is no longer communication with the mobile units 304 and 306, the mobile units 304 and 306 update their respective synchronization identifications to SYNC_ID=304, the lowest synchronization value in the network 300. Therefore, on the reconnection of the mobile unit 302 to the network 300, the synchronization process is repeated in accordance with the procedure outlined in FIG. 6B and FIG. 7.

Figure 7:
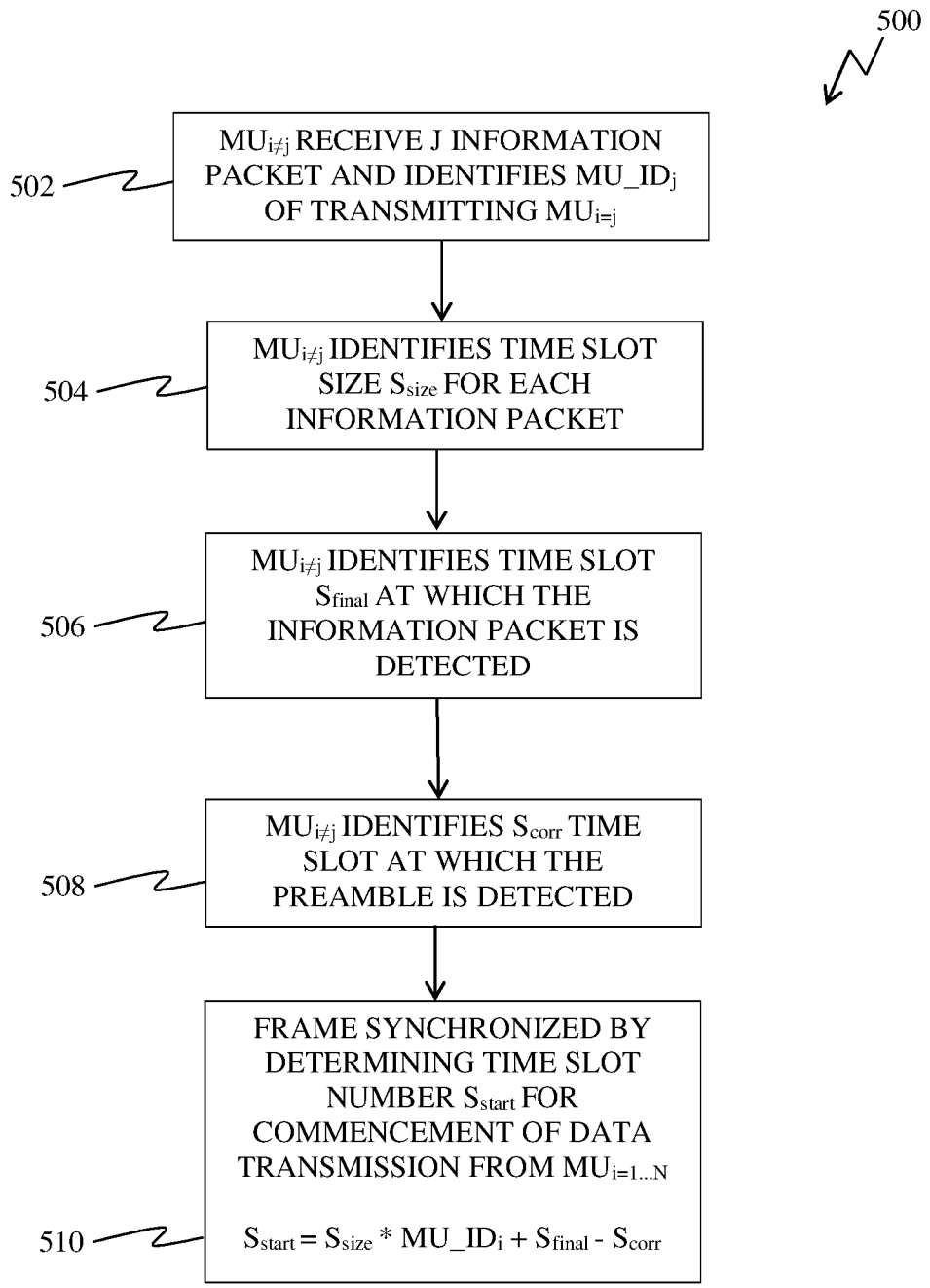
FIG. 7 shows a flow chart for frame synchronizing the mobile units in the TDMA communication network, in accordance with a preferred embodiment of the present invention.

Reference is now made to FIG. 7, which shows a flow chart 500 for a typical procedure for frame or logic synchronizing of the mobile units $MU_{i=j}$, in accordance with a preferred embodiment of the present invention.

In the procedure outlined hereinbelow regarding frame synchronization, it is assumed that $MU_{i=j}$ is the mother mobile unit.

In step 502, the mobile units $MU_{i \neq j}$ receive the information packet 18 and the mobile units $MU_{i \neq j}$ identify the identification number MU_ID for the mobile $MU_{i=j}$. In step 504, at each mobile unit $MU_{i \neq j}$ a predetermined slot time size $S_{size}$ is identified for the information packet 18 received at each mobile unit $MU_{i=j}$. Additionally, in step 506, a time slot $S_{final}$(i=1 ... N), indicating the detection of the information packet 18, is $S_{final}$ is identified at each of the mobile units $MU_{i \neq j}$.

In step 508, a time slot $S_{corr}$(i=1 ... N) a final time slot at which the preamble of the information packet 18 is detected, is identified the mobile units $MU_{i \neq j}$.

In step 510, a time slot number $S_{start}$ for a commencement of data transmission from each one of the plurality of the mobile units $MU_{i=1 ... N}$ is determined by:

$$S_{start}(i=1,2 \ldots N)=S_{size}*MU\_ID_i+S_{final}(i=1 \ldots N)-S_{corr}(i=1 \ldots N).$$

Since the mobile units $MU_i$ are currently time and frame synchronized, data transmissions within the network 10 can commence.

It is appreciated that the parameter $S_{size}$ is different for each information packet type (identified by MU_TYPE).

Although the procedure for directed synchronization is shown for three mobile units, it is appreciated that to a skilled man of the art, this procedure is adaptable to any number of mobile units of the network 10.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A method for TDMA synchronization comprising:
providing an ad-hoc TDMA mobile communication network, said communication network comprises a plurality of mobile units;
transmitting an information packet from a mobile unit of said plurality of mobile units to each remaining one of said plurality of mobile units, said information packet comprises at least a preamble;
receiving said information packet at each remaining one of said plurality of mobile units;
measuring at each remaining one of said plurality of mobile units a corresponding preamble detection time $t_{rx,i}$ of said information packet;
wherein said method further comprising:
comparing at each remaining one of said plurality of mobile units said corresponding preamble detection time $t_{rx,i}$ with a predetermined time parameter $t_{corr}$, and
adjusting said corresponding preamble detection time $t_{rx,i}$ of each remaining one of said plurality of mobile units to equal to $t_{corr}$, if $t_{rx,i}$ is less than $t_{corr}$, thereby synchronizing the TDM time slot of each remaining one of said plurality of said mobile units with the TDM slot of said transmitting mobile unit;
configuring said each remaining one of said plurality of mobile units to wait for a further information packet without adjusting said corresponding preamble detection time, if $t_{rx,i}$ of said each one of said plurality of mobile units equals $t_{corr}$;
configuring said each remaining one of said plurality of mobile waiting for a further information packet without adjusting said corresponding preamble detection time, if $t_{rx,i}$ is greater than $t_{corr}$;
configuring said information packet to further comprise a mobile unit identification number, MU_ID, a mobile unit synchronization identification number, SYNC_ID and a data payload;
identifying a predetermined slot time size $S_{size}$ for said information packet;
identifying said at least one mobile unit identification number MU_ID in said received communication packet;
identifying at each one of said plurality of said mobile units, a time slot number $S_{corr}$ at which said preamble terminates;
identifying a final time slot $S_{final}$ at which detection of said data packet received from said transmitting mobile unit is detected;
determining a time slot number $S_{start}$ for a commencement of common TDMA logical scheme from each remaining one of said plurality of said mobile units:

$$S_{start} = S_{size} * MU\_ID + S_{final} - S_{corr},$$

thereby frame synchronizing said common TDMA logical scheme from said at least one mobile unit and said each remaining one of said plurality of said mobile units; and
configuring said method to receive said information packet at different reception times.

2. The method for TDMA synchronization according to claim 1, wherein further comprising comparing said mobile unit synchronization identification number of each remaining one of said plurality of mobile units with said mobile identification number of said transmitting mobile unit thereby ensuring that said each remaining one of said plurality remains in communication with said transmitting mobile unit.

3. The method for TDMA synchronization method according to claim 1, wherein said predetermined time parameter $t_{corr}$ is determined by implementation of the physical interface.

4. The method for TDMA synchronization according to claim 1, wherein further comprising each remaining one of said plurality of mobile units retaining said SYNC_ID if said transmitting mobile unit exits said communication network.

5. The method for TDMA synchronization according to claim 1, wherein further comprising adjusting said SYNC_ID value of said each remaining one of said plurality of mobile units to correspond to said SYNC_ID value of said transmitting mobile unit if said SYNC_ID of said each remaining one of said plurality of mobile units is greater than said SYNC_ID value of said transmitting mobile unit.

6. The method for TDMA synchronization according to claim 5, wherein further comprising said each remaining one of said plurality of mobile units retains its SYNC_ID value if said SYNC_ID value of said each remaining one of said plurality of mobile units is less than said SYNC_ID value of said transmitting mobile unit.

7. The method for TDMA synchronization according to claim 5, wherein further comprising said each remaining one of said plurality of mobile units retains its SYNC_ID value if said SYNC_ID value of said each remaining one of said plurality of mobile units equals said SYNC_ID value of said transmitting mobile unit.

8. A system for TDMA synchronization comprising an ad-hoc TDMA mobile communication network and a plurality of mobile units;
wherein said mobile units receive an information packet comprising at least a preamble, said information packet is transmitted from a mother mobile unit of said communication network to each one of said plurality of mobile units, said each one of said plurality of mobile units measures a corresponding preamble detection time $t_{rx,i}$ and compares said corresponding preamble detection time $t_{rx,i}$ with a system time parameter $t_{corr}$ and adjusts said corresponding preamble detection time to equal said system time parameter $t_{corr}$, if said corresponding preamble detection time is less than $t_{corr}$;
further wherein:
(i) said system comprising said one of said plurality of mobile units waiting for a further information packet without adjusting said corresponding preamble detection time, if $t_{rx,i}$ equals $t_{corr}$;
(ii) said one of said plurality of mobile waiting for a further information packet without adjusting said corresponding preamble detection time, if $t_{rx,i}$ is greater than $t_{corr}$;
(iii) said information packet further comprises a mobile unit identification number, MU_ID, a mobile unit synchronization identification number, SYNC_ID and a data payload;
(iv) said system further comprising identifying a predetermined slot time size $S_{size}$ for said information packet;
(v) said system further comprising identifying said at least one mobile unit identification number MU_ID in said received communication packet;
(vi) said system further comprising identifying at each one of said plurality of said mobile units, a time slot number $S_{corr}$ at which said preamble terminates;

(vii) said system further comprising a final time slot $S_{final}$ at which detection of said data packet received from said transmitting mobile unit is detected;

(viii) said system further comprising determining a time slot number $S_{start}$ for a commencement of common TDMA logical scheme from each remaining one of said plurality of said mobile units:

$$S_{start} = S_{size} * MU\_ID + S_{final} - S_{corr},$$

thereby frame synchronizing said common TDMA logical scheme from said at least one mobile unit and said each remaining one of said plurality of said mobile units;

(ix) said information packet is received at different reception times; and (x) said system further comprising comparing said mobile unit synchronization identification number of each remaining one of said plurality of mobile units with said mobile identification number of said transmitting mobile unit thereby ensuring that said each remaining one of said plurality remains in communication with said transmitting mobile unit;

(xi) said predetermined time parameter $t_{corr}$ is determined by implementation of the physical interface;

(xii) said system further comprising each remaining one of said plurality of mobile units retaining said SYNC_ID if said transmitting mobile unit exits said communication network.

9. The system for TDMA synchronization according to claim 8, wherein further comprising adjusting said SYNC_ID value of said each remaining one of said plurality of mobile units to correspond to said SYNC_ID value of said transmitting mobile unit if said SYNC_ID of said each remaining one of said plurality of mobile units is greater than said SYNC_ID value of said transmitting mobile unit.

10. The system for TDMA synchronization according to claim 9, wherein further comprising said each remaining one of said plurality of mobile units retains its SYNC_ID value if said SYNC_ID value of said each remaining one of said plurality of mobile units is less than said SYNC_ID value of said transmitting mobile unit.

11. The system for TDMA synchronization according to claim 9, wherein further comprising said each remaining one of said plurality of mobile units retains its SYNC_ID value if said SYNC_ID value of said each remaining one of said plurality of mobile units equals said SYNC_ID value of said transmitting mobile unit.

12. A device for TDMA synchronization in an ad-hoc TDMA mobile communication network;

wherein said device is configured for receiving an information packet comprising at least a preamble, said information packet is transmitted from a mother mobile unit of said communication network to each said device, said device measures a corresponding preamble detection time $t_{rx,i}$ and compares said corresponding preamble detection time $t_{rx,i}$ with a predetermined time parameter $t_{corr}$ and adjusts said corresponding preamble detection time to equal said predetermined time parameter $t_{corr}$, if said corresponding preamble detection time is less than $t_{corr}$;

further wherein:

(i) said device waits for a further information packet without adjusting said corresponding preamble detection time, if $t_{rx,i}$ equals $t_{corr}$;

(ii) said device waits for a further information packet without adjusting said corresponding preamble detection time, if $t_{rx,i}$ is greater than $t_{corr}$;

(iii) said information packet further comprises a mobile unit identification number, MU_ID, a mobile unit synchronization identification number, SYNC_ID and a data payload;

(iv) said device further comprising identifying a predetermined slot time size $S_{size}$ for said information packet;

(v) said device further comprising identifying said at least one mobile unit identification number MU_ID in said received communication packet;

(vi) said device further comprising identifying at each one of said plurality of said mobile units, a time slot number $S_{corr}$ at which said preamble terminates;

(vii) said device further comprising a final time slot $S_{final}$ at which detection of said data packet received from said transmitting mobile unit is detected;

(viii) said device further comprising:
determining a time slot number $S_{start}$ for a commencement of common TDMA logical scheme from each remaining one of said plurality of said mobile units:

$$S_{start} = S_{size} * MU\_ID + S_{final} - S_{corr},$$

thereby frame synchronizing said common TDMA logical scheme from said at least one mobile unit and said each remaining one of said plurality of said mobile units;

(ix) said information packet is received at different reception times;

(x) said device further comprising comparing said mobile unit synchronization identification number of each remaining one of said plurality of mobile units with said mobile identification number of said transmitting mobile unit thereby ensuring that said each remaining one of said plurality remains in communication with said transmitting mobile unit;

(xi) said predetermined time parameter $t_{corr}$ is determined by implementation of the physical interface;

(xii) said device further comprising each remaining one of said plurality of mobile units retaining said SYNC_ID if said transmitting mobile unit exits said communication network.

13. The device for TDMA synchronization according to claim 12, wherein further comprising adjusting said SYNC_ID value of said each remaining one of said plurality of mobile units to correspond to said SYNC_ID value of said transmitting mobile unit if said SYNC_ID of said each remaining one of said plurality of mobile units is greater than said SYNC_ID value of said transmitting mobile unit.

14. The device for TDMA synchronization according to claim 13, wherein further comprising said each remaining one of said plurality of mobile units retains its SYNC_ID value if said SYNC_ID value of said each remaining one of said plurality of mobile units is less than said SYNC_ID value of said transmitting mobile unit.

15. The device for TDMA synchronization according to claim 13, wherein further comprising said each remaining one of said plurality of mobile units retains its SYNC_ID value if said SYNC_ID value of said each remaining one of said plurality of mobile units equals said SYNC_ID value of said transmitting mobile unit.

* * * * *